US008868125B2

(12) United States Patent
Bonneville et al.

(10) Patent No.: US 8,868,125 B2
(45) Date of Patent: Oct. 21, 2014

(54) METHOD FOR DETERMINING IN WHICH CONDITION A FIRST BASE STATION WHICH IS IN AN ENERGY SAVING MODE HAS TO SWITCH IN ANOTHER OPERATION MODE

(75) Inventors: Herve Bonneville, Rennes Cedex (FR); Nicolas Gresset, Rennes Cedex (FR); Mourad Khanfouci, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 13/242,868

(22) Filed: Sep. 23, 2011

(65) Prior Publication Data
US 2012/0088531 A1 Apr. 12, 2012

(30) Foreign Application Priority Data

Oct. 6, 2010 (EP) ..................................... 10186655

(51) Int. Cl.
*H04B 7/00* (2006.01)
*H04W 52/02* (2009.01)
*H04W 36/08* (2009.01)

(52) U.S. Cl.
CPC ............ *H04W 52/0206* (2013.01); *Y02B 60/50* (2013.01); *H04W 36/08* (2013.01)
USPC ........ 455/525; 455/436; 455/452.2; 370/331; 370/252

(58) Field of Classification Search
USPC .......... 455/436, 522, 450, 509, 452.2, 68, 69, 455/67.11, 67.13; 370/318, 328, 329, 331, 370/336, 252
See application file for complete search history.

(56) References Cited

U.S. PATENT DOCUMENTS

| 7,577,456 | B2* | 8/2009 | Gunnarsson et al. | .......... 455/522 |
| 7,620,004 | B2* | 11/2009 | Brueck et al. | .................. 370/317 |
| 2005/0043062 | A1* | 2/2005 | Ahn et al. | ...................... 455/560 |
| 2005/0208946 | A1 | 9/2005 | Kahana | |

(Continued)

FOREIGN PATENT DOCUMENTS

EP 2 056 628 A1 5/2009
WO WO 2010/093298 A1 8/2010

OTHER PUBLICATIONS

Extended European Search Report issued on Mar. 30, 2011 in corresponding European Application No. 10186655.6 filed on Oct. 6, 2010.

(Continued)

*Primary Examiner* — Sujatha Sharma
(74) *Attorney, Agent, or Firm* — Oblon, Spivak, McClelland, Maier & Neustadt, L.L.P.

(57) ABSTRACT

The present invention concerns a method for determining, in a wireless cellular telecommunication network, in which condition a first base station which is in an energy saving mode has to switch in an operation mode which enables a mobile terminal to be handled by the first base station and wherein the mobile terminal is currently handled by a second base station. The method comprises the steps of:
obtaining information representative of a path gain between the second base station and the mobile terminal and of a path gain between the first base station and the mobile terminal,
determining, from the information representative of the path gains a power of transmission of signal transferred by the first base station which enables the mobile terminal to be handled by the first base station and by the second base station.

16 Claims, 6 Drawing Sheets

(56) References Cited

U.S. PATENT DOCUMENTS

| | | | |
|---|---|---|---|
| 2010/0240387 A1* | 9/2010 | Ezaki | 455/452.2 |
| 2011/0141939 A1* | 6/2011 | Medapalli | 370/252 |
| 2011/0171984 A1* | 7/2011 | Hosono et al. | 455/509 |
| 2012/0157152 A1* | 6/2012 | Blomgren et al. | 455/522 |
| 2013/0203430 A1* | 8/2013 | Gan et al. | 455/450 |
| 2013/0230027 A1* | 9/2013 | Das et al. | 370/336 |

OTHER PUBLICATIONS

Shenzhen C: "Dynamic Setup of HNBs for Energy Savings and Interference Reduction", $3^{rd}$ Generation Partnership Project (3GPP); Technical Specification Group (TSG) Radio Access Network (RAN); Working Group 3 (WG3), vol. R3-080658, Mar. 31, 2008, XP 003023429, pp. 1-6.

* cited by examiner

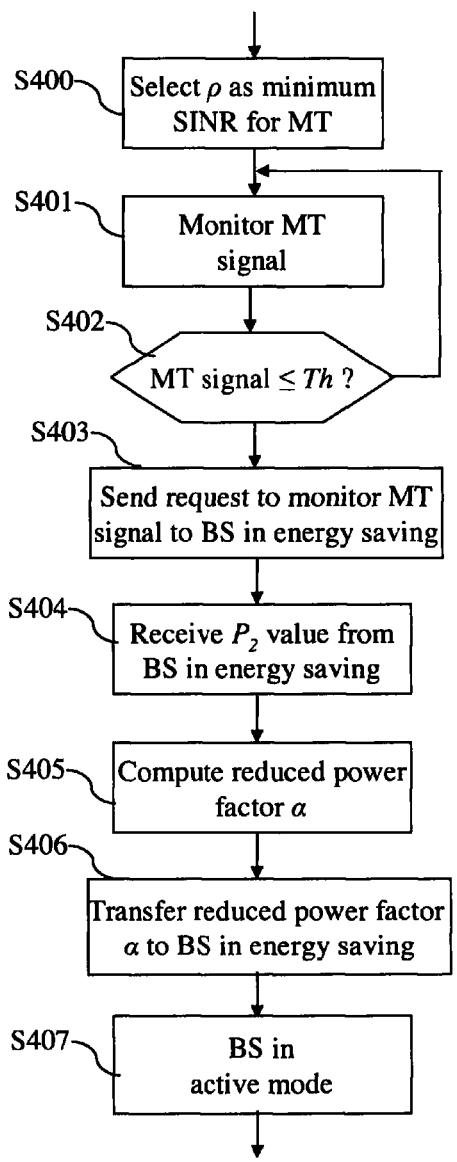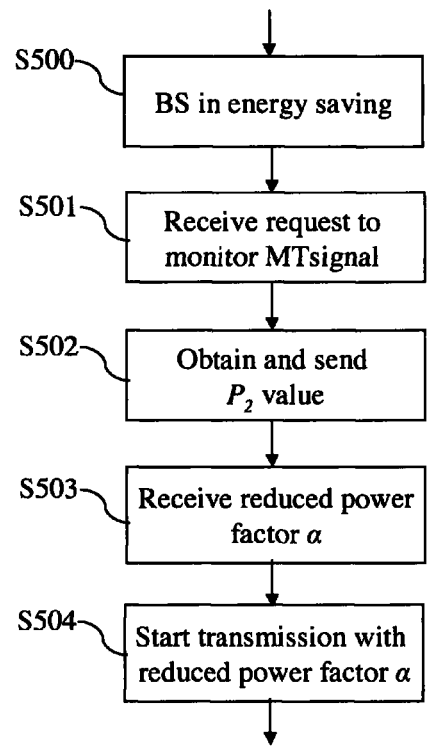
Fig. 4
Fig. 5

US 8,868,125 B2

METHOD FOR DETERMINING IN WHICH CONDITION A FIRST BASE STATION WHICH IS IN AN ENERGY SAVING MODE HAS TO SWITCH IN ANOTHER OPERATION MODE

The present invention relates generally to a method and a device for determining, in a wireless cellular telecommunication network, in which condition a first base station which is in an energy saving mode has to switch in an operation mode which enables a mobile terminal to be handled by the first base station.

More precisely, the present invention is in the field of the management of the activity of base stations of a wireless cellular telecommunication network.

The management of the activity of base stations enables to reduce the electric power consumed by the wireless cellular telecommunication network.

The management of the activity of a base station consists in switching or not the base station in an energy saving mode. The switching is executed according to at least one criterion, which is for example the load of the base station and/or the load of surrounding base stations.

For example, when a base station does not handle any mobile terminal, the base station can be set in an energy saving mode wherein the base station transfers radio signals at a low power level or at most sixty percent of the nominal radio signal transmission power or interrupts the transmission of radio signals.

Few or no mobile terminals may be located in some areas covered by the wireless cellular telecommunication network, for example during night. By switching the base station or each base station which manages cell or cells in these areas in the energy saving mode, energy is saved without degrading the quality of service provided by the wireless cellular telecommunication network.

When a mobile terminal reaches an area near a base station which is in an energy saving mode or when the load of base stations surrounding a base station which is in an energy saving mode is high, the base station which is in an energy saving mode should be switched in a normal operation mode which enables the mobile terminal or other mobile terminals handled by surrounding base stations to be handled by the base station which is in an energy saving mode.

FIGS. 1a and 1b represent an example of such classical switching of a base station from an energy saving mode to a normal operation mode.

Three base stations BS1 to BS3 are shown in FIG. 1 for the sake of clarity but the wireless cellular telecommunication network may comprise a more important number of base stations BS.

In FIG. 1a, the base station BS2 is in the energy saving mode and the base stations BS1 and BS3 are in the normal operation mode.

The base station BS1 transfers and receives signals in the cell CE1a.

A cell CE of a base station BS is an area in which mobile terminals located in the cell of the base station can be handled by the base station BS, i.e. can establish a communication with a remote telecommunication device through the base station BS.

The mobile terminals MT1, MT2, MT3 and MT4 are located in the cell CE1a of the base station BS1.

The base station BS3 transfers and receives signals in the cell CE3a.

The mobile terminal MT5 is located in the cell CE3a of the base station BS3.

According to the example of FIG. 1a, the mobile terminal MT2 is located at the edge of the cell CE1a and is moving out from the cell CE1a as shown by the arrow noted AR and enters in an area that could have been covered by the base station BS2 if the base station was in normal operation mode.

It is then decided that the base station BS2 is switched to the normal operation mode and starts to transfer radio signals at a nominal transmission power defined for example according to radio planning techniques or stored in the non volatile memory of the base station BS2.

In FIG. 1b, the base stations BS1, BS2 and BS3 are in the normal operation mode.

As shown in FIG. 1b, the transmission of radio signals by the base station BS2 at normal operation mode transmission power reduces the areas covered by the cells CE1b and CE3b of the base stations BS1 and BS3.

As the base station BS2 starts to transfer signals at the nominal transmission power, the signals transferred by the base station BS2 interfere with the signals transferred by the base stations BS1 and BS3.

According to the example of FIG. 1b, the mobile terminals MT1, MT2 and MT4 are no more covered by the cell CE1b of the base station BS1 once the base station BS2 is switched in the normal operation mode.

Such sudden modification of signal reception conditions may cause, if one of the mobile terminal MT1, MT2 or MT4 was involved in a communication with a remote telecommunication device through the base station BS1, a sudden interruption of the communication.

According to the example of FIG. 1b, the sudden modification of signal reception conditions causes the mobile terminal MT1 to be no more included in any cell.

The switching to the normal operation mode of the base station BS2 degrades the quality of service of the wireless cellular telecommunication network.

The present invention aims at providing a wireless cellular telecommunication network wherein the quality of service of the wireless cellular telecommunication network is kept when a base station which is in an energy saving mode has to switch in an operation mode which enables a mobile terminal to be handled by the base station while reducing the electric energy power consumption.

To that end, the present invention concerns a method for determining, in a wireless cellular telecommunication network, in which condition a first base station which is in an energy saving mode has to switch in an operation mode which enables a mobile terminal to be handled by the first base station, the mobile terminal being currently handled by a second base station, characterised in that the method comprises the steps of:

obtaining information representative of a path gain between the second base station and the mobile terminal, obtaining information representative of a path gain between the first base station and the mobile terminal, determining, from the information representative of the path gain between the first base station and the mobile terminal and from the information representative of the path gain between the second base station and the mobile terminal a power of transmission of signal transferred by the first base station which enables the mobile terminal to be handled by the first base station and by the second base station.

The present invention concerns also a device for determining, in a wireless cellular telecommunication network, in which condition a first base station which is in an energy saving mode has to switch in an operation mode which enables a mobile terminal to be handled by the first base station, the mobile terminal being currently handled by a second base station, characterised in that the device for determining in which condition the first base station which is in the energy saving mode has to switch comprises:

means for obtaining information representative of a path gain between the second base station and the mobile terminal, means for obtaining information representative of a path gain between the first base station and the mobile terminal, means for determining, from the information representative of the path gain between the first base station and the mobile terminal and from the information representative of the path gain between the second base station and the mobile terminal a power of transmission of signal transferred by the first base station which enables the mobile terminal to be handled by the first base station and by the second base station.

Thus, the quality of service of the wireless cellular telecommunication network is kept when the first base station which is in an energy saving mode switches in an operation mode which enables the mobile terminal to be handled by the first base station.

According to a particular feature, the step of obtaining information representative of a path gain between the first base station and the mobile terminal and the determining step are executed according to the value of the information representative of the path gain between the second base station and the mobile terminal.

Thus, the base station in energy saving mode stays in energy saving mode as long as the mobile terminal can be handled by the second base station. Energy savings are maximised.

According to a particular feature, the second base station transfers a message requesting the first base station to monitor the power of the signal transferred by the mobile terminal and received by the first base station, the message further comprising the transmit power of signals transferred by the mobile terminal and the information representative of the path gain between the first base station and the mobile terminal is determined, by the first base station.

Thus, the second base station doesn't need to be aware of the nominal transmit power the first base station uses to transmit its signals when the first base station is in normal operation mode.

According to a particular feature, the second base station transfers a message requesting the first base station to transfer in response the power of the signal transferred by the mobile terminal and received by the first base station the power of transmission of signal transferred by the first base station which enables the mobile terminal to be handled by the first base station and by the second base station is determined by the second base station.

Thus, the number of parameters provided by the second base station to the first base station is minimized.

According to a particular feature, the second base station transfers a message requesting the first base station to monitor the power of the signal transferred by the mobile terminal and received by the first base station, and the power of transmission of signal transferred by the first base station is determined by the first base station.

Thus, the number of parameters provided by the first base station to the second base station is minimized.

According to a particular feature, a message is transferred to the mobile terminal, the message requesting the mobile terminal to transfer information representative of the power of signal received by the mobile terminal and transferred by the first base station and the power of transmission of signal transferred by the first base station when the first base station transfers signal which enables the mobile terminal to be handled by the first base station and by the second base station is determined, by the second base station, from the power of the signal transferred by the first base station and received by the mobile terminal and the power of signal transferred by the second base station and received by the mobile terminal.

Thus, the first base station doesn't have to monitor signals from the mobile terminal.

According to a particular feature, prior to transferring the message to the mobile terminal, the second base station transfers a message requesting the first base station to transfer signal at a transmission power which does not enable a mobile terminal to be handled by the first base station.

Thus, the first base station remains longer in an energy saving state where it transmits no signals.

According to a particular feature, the power of transmission is computed as an increase or decrease factor of the power of transmission of the first base station.

According to a particular feature, the threshold is determined from a signal interference plus noise ratio value determined for the mobile terminal.

Thus, the threshold can be adapted to each mobile terminal.

According to a particular feature, the signal interference plus noise ratio value is determined according to a quality of service to be provided to the mobile terminal.

Thus, impact on the ongoing communication is limited for the mobile terminal.

According to a particular feature, the quality of service to be provided to the mobile terminal is increased when the power of signal received by the mobile terminal from the second base station is lower than or equal to the threshold and/or a more robust modulation and coding scheme is allocated to the mobile terminal when the power of signal received by the mobile terminal from the second base station is lower than or equal to the threshold and/or a more robust modulation and coding scheme is allocated to the mobile terminal.

Thus, the mobile terminal can be served longer by the second base station.

According to a particular feature, plural base stations neighbouring the second base station are in the energy saving mode, a message is transferred to each base station neighbouring the second base station, the message requesting to monitor the power of the signal transferred by the mobile terminal and received by the first base station, and the method further comprises the step of selecting among the base stations neighbouring the second base station, the first base station as the one receiving the signal transferred by the mobile terminal at the highest power.

Thus, the number of base stations that are switched from their energy saving state to their operational mode is limited and energy saving gain is increased.

According to a particular feature, plural base stations neighbouring the second base station are in the energy saving mode, the message requesting the mobile terminal to transfer information representative of the power of signal received by the mobile terminal and transferred by each base station neighbouring the second base station and the method further comprises the step of selecting among the base stations neighbouring the second base station, the first base station as the one transferring the signal received by the mobile terminal at the highest power.

According to a particular feature, the second base station transfers information identifying the mobile terminal to the first base station, information identifying the mobile terminal being a cell radio network temporary identifier allocated by the second base station to the mobile terminal or dedicated pilot sequence and time/frequency pattern allocated by the second base station to the mobile terminal or a contention-based channel for initial transmission from mobile terminal to the second base station.

Thus, the first base station does not have to decode data from signals transmitted by the second base station.

According to still another aspect, the present invention concerns computer program which can be directly loadable into a programmable device, comprising instructions or portions of code for implementing the steps of the method according to the invention, when said computer program is executed on a programmable device.

Since the features and advantages relating to the computer program are the same as those set out above related to the method and apparatus according to the invention, they will not be repeated here.

The characteristics of the invention will emerge more clearly from a reading of the following description of an example embodiment, the said description being produced with reference to the accompanying drawings, among which:

Figure 6:
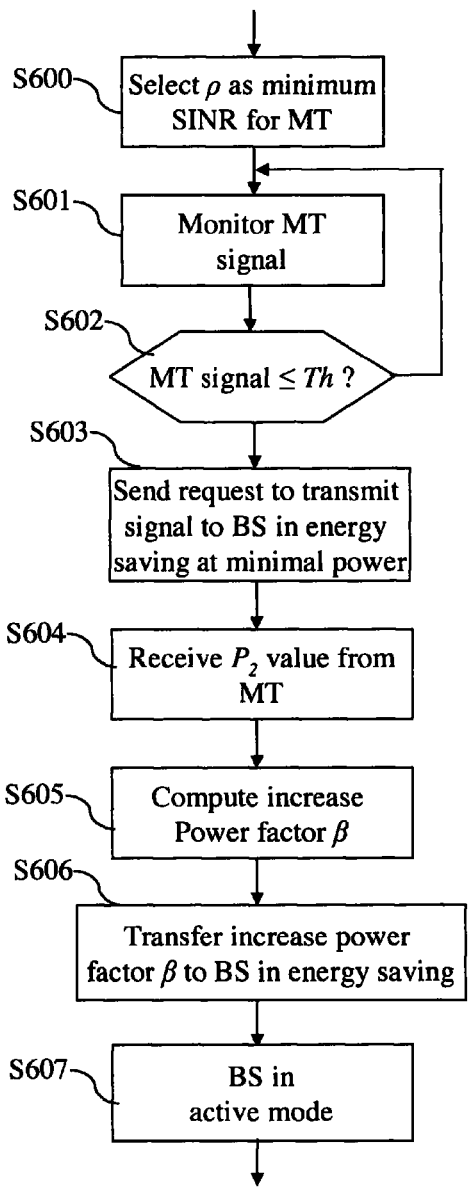
Figure 7:
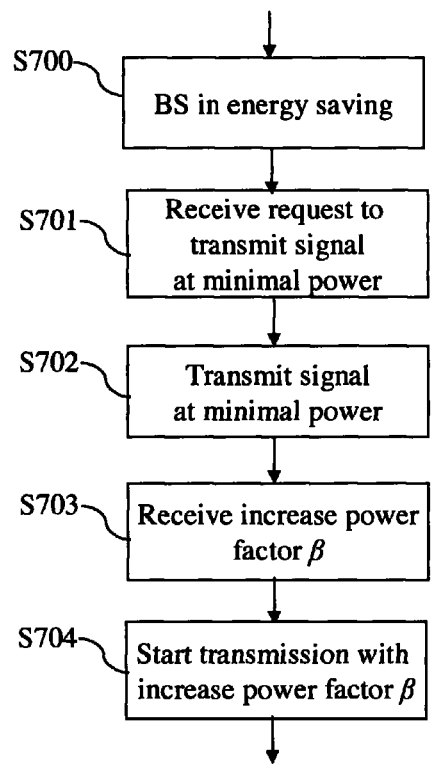
Figure 8:
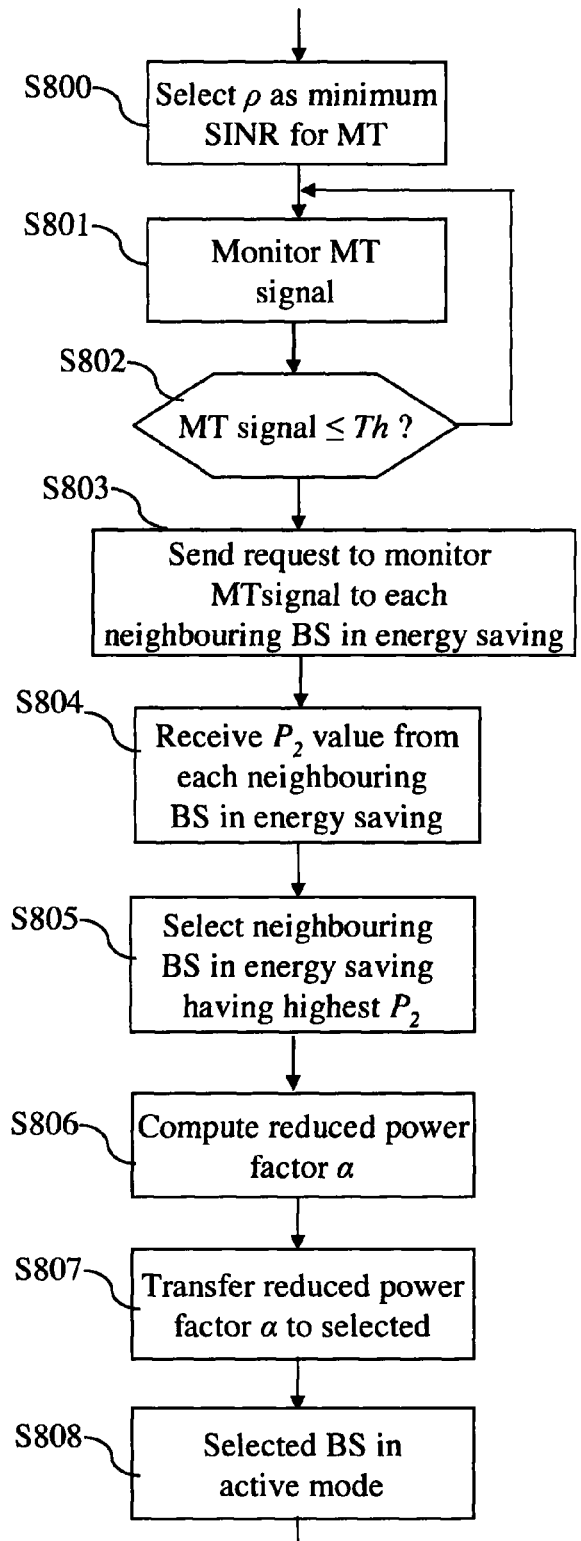
Figure 9:
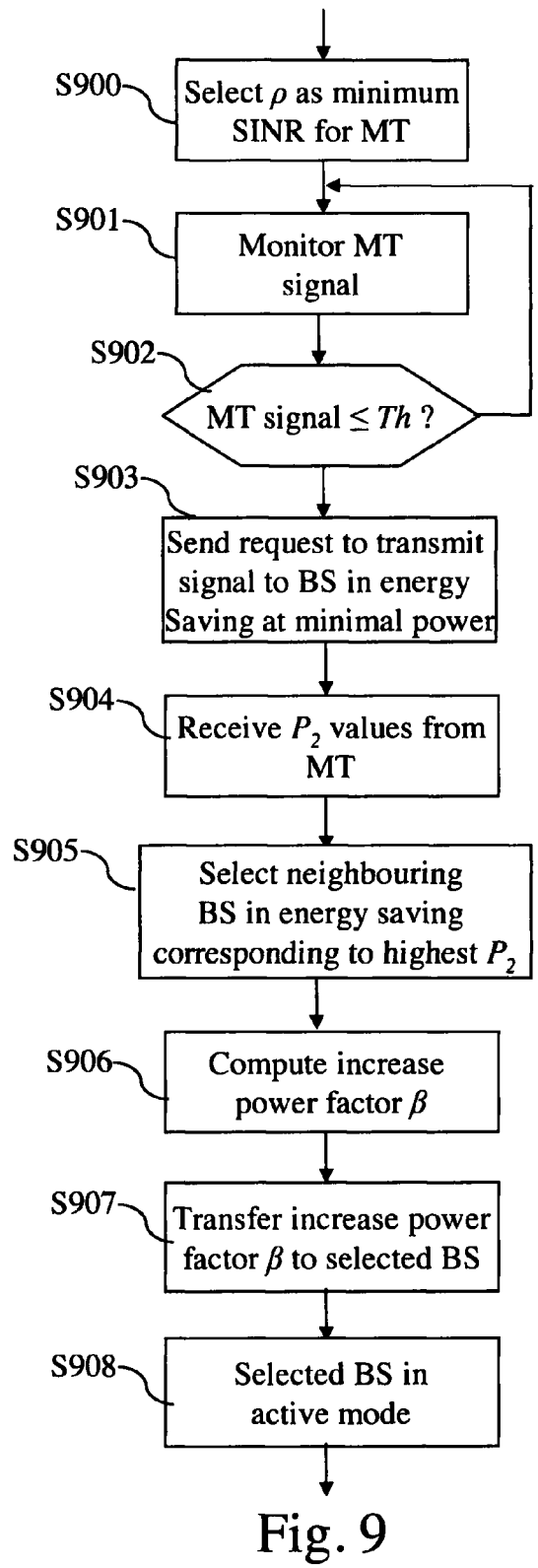

FIG. 4 discloses an example of an algorithm executed by a base station which handles at least one mobile terminal according to a first mode of realization of the present invention when the base station is surrounded by a base station which is in energy saving mode;

FIG. 5 discloses an example of an algorithm executed by a base station which is in energy saving mode according to the first mode of realization of the present invention;

FIG. 6 discloses an example of an algorithm executed by a base station which handles at least one mobile terminal according to a second mode of realization of the present invention when the base station is surrounded by a base station which is in energy saving mode;

FIG. 7 discloses an example of an algorithm executed by a base station which is in energy saving mode according to the second mode of realization of the present invention;

FIG. 8 discloses an example of an algorithm executed by a base station which handles at least one mobile terminal according to the first mode of realization of the present invention when the base station is surrounded by plural base stations which are in energy saving mode;

FIG. 9 discloses an example of an algorithm executed by a base station which handles at least one mobile terminal according to the second mode of realization of the present invention when the base station is surrounded by plural base stations which are in energy saving mode.

Figure 2:
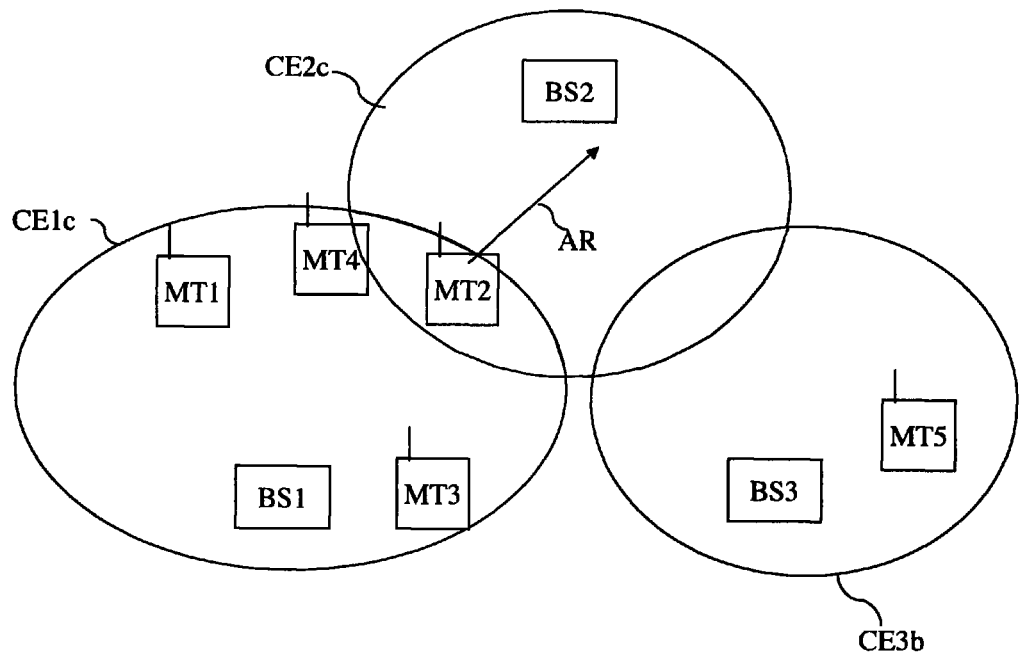
FIG. 2 represents an example of a switching of a base station from an energy saving mode to an operation mode which enables at least one mobile terminal currently handled by another base station to be handled by the base station according to the present invention.

FIG. 2 represents an example of a switching of a base station from an energy saving mode to an operation mode which enables at least one mobile terminal currently handled by another base station to be handled by the base station according to the present invention.

It has to be noted here that the present invention will be described in an example wherein each base station has one cell. The present invention is also applicable when one or plural base stations handle respectively plural cells.

In the example of FIG. 2, the base station BS1 handles the mobile terminals MT1, MT2, MT3 and MT4. The mobile terminal MT2 is moving to the direction of the base station BS2 which is in the energy saving mode.

The base station BS1 receives from the mobile terminals MT1 to MT4, measurement reports on signal transferred by the base station BS1.

The base station BS1 checks if the power of signal received by the mobile terminals MT1 to MT4 from the base station BS1 is lower than or equal to a threshold Th.

For example, the power of signal received by the mobile terminal MT2 from the base station BS1 is lower than or equal to the threshold Th.

The threshold Th will be disclosed with more details hereinafter.

The base station BS1 obtains information representative of a path gain between the base station BS1 and the mobile terminal MT2.

The base station BS1 obtains information representative of a path gain between the base station BS2 and the mobile terminal MT2.

The base station BS1 determines, from information representative of the path gain between the base station BS2 and the mobile terminal MT2 and from information representative of a path gain between the base station BS1 and the mobile terminal MT2., a power of transmission of signal transferred by the base station BS2 when the base station BS2 transfers signal which enables the mobile terminal MT2 to be handled by the base station BS2 and by the base station BS1.

More particularly, information representative of a path gain between the second base station and the mobile terminal are obtained according to the value of the power of signal received by the mobile terminal MT2 from the base station BS1 and the determining step is executed if the power of signal received by the mobile terminal from the second base station is lower than or equal to the threshold.

More precisely, the power of transmission of signal transferred by the base station BS2 when the base station BS2 is in the operation mode is a transmission power which enables the mobile terminal MT2 to be handled with a given quality of service by the base station BS2 and by the base station BS1.

According to a particular characteristic of the present invention, the transmission power of the base station BS2 is set in order to be received, at mobile terminal MT2 side, at a level equal to the level of the signal received from base station BS1, at mobile terminal MT2 side.

Figure 1A:
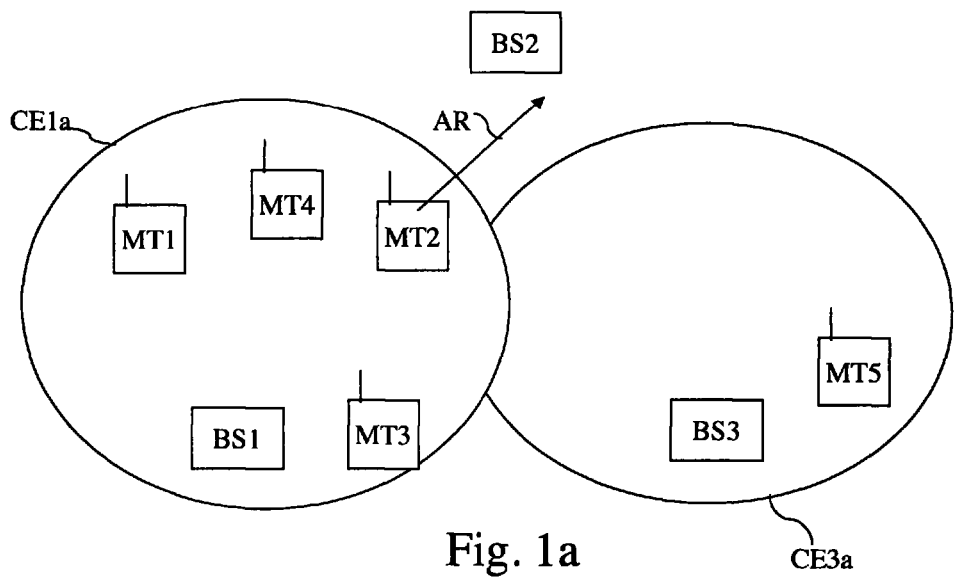
FIGS. 1a and 1b represent an example of classical switching of a base station from an energy saving mode to a normal operation mode.
Figure 1B:
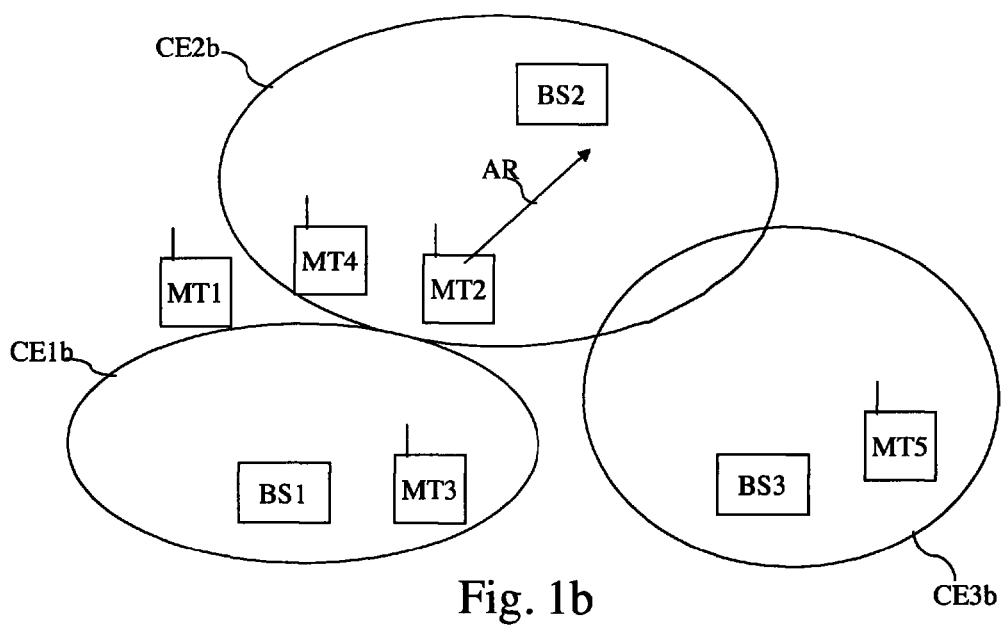

As the mobile terminal MT2 is located at the cell edge of CE1c of base station BS1 thanks to the choice of threshold Th, interferences from base station BS2 are reduced and the area covered by the cell CE1c of base station BS1 is less reduced compared to the example of FIG. 1b.

According to the example of FIG. 2, the mobile terminals MT1, MT2 and MT4 are still comprised in the cell CE1c of the base station BS1 once the base station BS2 is switched in the normal operation mode.

A handover of the mobile terminal MT2 can be performed between the base stations BS1 and BS2.

The base station BS1 to BS3 may be named nodes or access points or home base stations or pico base stations.

The mobile terminals MT1 to MT5 may be a personal computer, a peripheral device like a set top box, or a phone.

Figure 3:
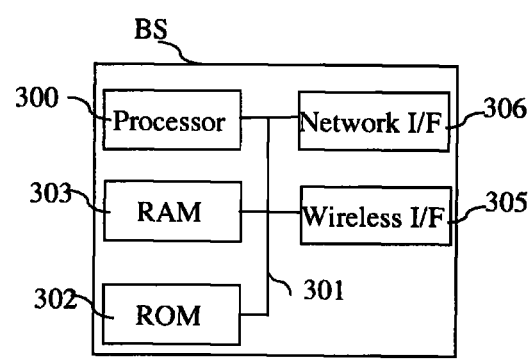
FIG. 3 is a diagram representing the architecture of a base station in which the present invention is implemented.

FIG. 3 is a diagram representing the architecture of a base station in which the present invention is implemented.

The base station BS has, for example, an architecture based on components connected together by a bus 301 and a processor 300 controlled by the programs as disclosed in FIGS. 4 to 9.

It has to be noted here that the base station BS may have an architecture based on dedicated integrated circuits.

The bus 301 links the processor 300 to a read only memory ROM 302, a random access memory RAM 303, a wireless interface 305 and a network interface 306.

The memory 303 contains registers intended to receive variables and the instructions of the programs related to the algorithms as disclosed in FIGS. 4 to 9.

The processor 300 controls the operation of the network interface 306 and of the wireless interface 305.

The read only memory 302 contains instructions of the programs related to the algorithms as disclosed in FIGS. 4 to 9, which are transferred, when the base station BS is powered on, to the random access memory 303.

The base station BS may be connected to a telecommunication network through the network interface 306. For example, the network interface 306 is a DSL (Digital Subscriber Line) modem, or an ISDN (Integrated Services Digital Network) interface, etc.

The wireless interface 305 may be switched in the energy saving mode. The energy saving mode is a mode wherein the base station transfers radio signals at a low power level or at most sixty percent of the nominal radio signal transmission power or interrupts the transmission of radio signals.

FIG. 4 discloses an example of an algorithm executed by a base station which handles at least one mobile terminal according to a first mode of realization of the present invention when the base station is surrounded by a base station which is in energy saving mode.

The present algorithm is executed by each base station of the wireless cellular telecommunication network when it is in an operation mode which enables a mobile terminal to be handled by the base station.

The algorithm of FIG. 4 will be disclosed when it is executed by the base station BS1.

More precisely, the present algorithm is executed by the processor 300 of the base station BS1 in parallel for each mobile terminal handled by the base station BS1.

At step S400, the processor 300 obtains a minimum signal interference plus noise ratio $\rho$ that should be provided, for example, to the mobile terminal MT2 the base station BS1 handles.

The minimum signal interference plus noise ratio $\rho$ is for example obtained according to a quality of service provided to the mobile terminal MT2 by the base station BS1.

At next step S401, the processor 300 monitors the power of signal received by the mobile terminal MT2 from the base station BS1 using, for example, measurement report transferred periodically by the mobile terminal MT2.

At next step S402, the processor 300 checks if the power of signal received by the mobile terminal MT2, from the base station BS1, is equal to or lower than the threshold Th determined for the mobile terminal MT2.

According to the invention, when signal power $P_1$ received from the base station BS1 by the mobile terminal MT2 is below the given threshold Th, the base station BS2 starts transmitting with a reduced power $\alpha P_{2n}$ ($0 \leq \alpha \leq 1$), which is received by the UE at power $\alpha P_2$, such as:

$$\begin{cases} \dfrac{P_1}{\alpha P_2 + N_0} \geq \rho \\ P_1 \leq \alpha P_2 \end{cases}$$

Where $P_1$ is the power of signal transferred by the base station BS1 and received by the mobile terminal MT2, $P_{2n}$ is the nominal transmission power of signal transferred by the base station BS2 without any power reduction, $N_0$ is the noise component received by the mobile terminal MT2 and $P_2$ is the power of signal transferred by the base station BS2 and received by the mobile terminal MT2.

The first equation expresses that mobile terminal MT2 is still handled by the base station BS1 with a SINR above minimum SINR $\rho$, although second equation means that the mobile terminal MT2 can be handed over to the base station BS2 when the base station BS2 transfers signal, where the mobile terminal MT2 would be handled with an equivalent minimum SINR $\rho$.

From above mentioned equations, we can deduce that:

$$\begin{cases} P_1 \geq \dfrac{\rho N_0}{1-\rho} = Th \\ \alpha \geq \dfrac{P_1}{P_2}. \end{cases}$$

Since the mobile terminal MT2 is in the cell CE1c of the base station BS1, $P_1$ verifies $P_1 \geq \rho N_0$. When $\rho<1$, i.e. when the mobile terminal MT2 is not in cell CE1c centre conditions, the threshold Th exists.

Thus, $$Th = \dfrac{\rho N_0}{1-\rho}.$$

The minimum SINR $\rho$ is determined in order to provide a robust communication between the base stations BS1 and BS2 and the mobile terminal MT2. A robust communication depends on the quality of service to be provided to the mobile terminal MT2 and/or depends on the amount of resources the base station BS1 may allocate to the mobile terminal MT2.

If the power of signal received by the mobile terminal MT2 from the base station BS1 is equal to or lower than the threshold Th determined for the mobile terminal MT2, the processor 300 moves to step S403. Otherwise, the processor 300 returns to step S401.

At next step S403, the processor 300 sends a message to the base station BS2 requesting the base station BS2, which is in energy saving mode, to monitor the power of signal transferred by the mobile terminal MT2 and received by the base station BS2.

The message comprises information identifying the mobile terminal MT2.

Information identifying the mobile terminal MT2 may be the local MAC (Media Access Control) identifier named also cell radio network temporary identifier (C-RNT1) allocated by the base station BS1 to the mobile terminal MT2.

From at least the base station BS1 cell identifier and parameters characteristics of the cell, the base station BS2 listens to signals transmitted by the base station BS1 in order to find the resources allocated by the base station BS1 to the mobile terminal MT2, and then measures the radio signal power transmitted by the mobile terminal MT2.

Parameters characteristics of the cell of the base station BS1 are for example the frequency bands used by the base station BS1 for uplink transmission. They can be known by the base station BS2 from configuration, or the base station BS1 can provide them to the base station BS2, or the base station BS2 can learn parameters characteristic of the cell of the base station BS1 from data broadcasted by the base station BS1.

It has to be noted here that if the base station BS2 is not synchronised with the base station BS1, the base station BS1 may provide to the base station BS2 in addition to the information identifying the mobile terminal MT2, the number of the time slot containing resources allocated by the base station BS1 to the mobile terminal MT2.

Information identifying the mobile terminal MT2 may be the dedicated pilot sequence and time/frequency pattern allocated by the base station BS1 to the mobile terminal MT2. In that case, the base station BS2 monitors pilot sequence signal power transferred by the mobile terminal MT2.

The pilot sequence may be a configuration of reference signals like Sounding Reference Signal (SRS) that the base station BS1 provides to the base station BS2 and to the mobile terminal MT2.

Information identifying the mobile terminal MT2 may be a Random Access Channel (RACH) which is a contention-based channel for initial uplink transmission, i.e. from mobile terminal MT2 to the base station BS1.

The base station BS1 reserves some RACH time/frequency/code resources without contention for the mobile terminal MT2, provides information representative of the reserved resources to the base station BS2 and requests the mobile terminal MT2 to transmit RACH in the reserved resources.

The message may further comprise the power $P_{UE}$ of signals transferred by the mobile terminal MT2.

At next step S404, the processor 300 receives the value of the power signal $P_2$ the mobile terminal MT2 would receive from the base station BS2 if the base station BS2 was transmitting at its nominal transmission power $P_{2n}$. The value $P_2$ comprises information representative of a measurement of the path gain between the mobile terminal MT2 and the base station BS2.

At next step S405, the processor 300 computes a power reduction factor $$\alpha = \frac{P_1}{P_2}$$

to be applied by the base station BS2 on its nominal transmission power $P_{2n}$.

The nominal transmit power $P_{2n}$ is determined for example according to radio planning techniques or from a value stored in the non volatile memory of the base station BS2.

At next step S406, the processor 300 commands the transfer, to the base station BS2, of the power reduction factor $\alpha$.

At next step S407, the processor 300 marks the base station BS2 as being in the operation mode which enables a mobile terminal to be handled by the base station BS2.

FIG. 5 discloses an example of an algorithm executed by a base station which is in energy saving mode according to the first mode of realization of the present invention.

The present algorithm is executed by each base station of the wireless cellular telecommunication network when it is in the energy saving mode.

The algorithm of FIG. 5 will be disclosed when it is executed by the base station BS2.

At step S500, the base station BS2 is in the energy saving mode, i.e. does not transfer radio signals or transfers radio signal at a power level which does not enable at least the mobile terminal MT2 to be handled by the base station BS2.

At next step S501, the processor 300 detects the reception of a message requesting the base station BS2 to monitor the power of signal transferred by the mobile terminal MT2 and received by the base station BS2.

The message comprises information identifying the mobile terminal MT2 like the one disclosed at step S403 of the algorithm of FIG. 4.

The message may further comprise the signal transmission power $P_{UE}$ of signals transferred by the mobile terminal MT2.

At next step S502, the processor 300 obtains the value of the power signal $P_2$ the mobile terminal MT2 would receive from the base station BS2 if the base station BS2 was transmitting at its nominal power $P_{2n}$.

The processor 300 commands the determination of the path gain $G_2$ between the mobile terminal MT2 and the base station BS2 from the signal transmission power $P_{UE}$ used by the mobile terminal MT2 and the power of signal transferred by the mobile terminal MT2 and received by the base station BS2.

The processor 300 reports $P_2 = G_2 \cdot P_{2n}$ to the base station BS1.

At next step S503, the processor 300 detects the reception of the power reduction factor $\alpha$.

At next step S504, the processor commands the wireless interface 305 in order to switch in an operation mode which enables at least the mobile terminal MT2 to be handled by the base station BS2 by transferring signal at power $\alpha \cdot P_{2n}$.

According to a first variant of realization of the first mode of realization, the message transferred at step S403 and received at step S501 does not comprise the signal transmission power $P_{UE}$ of signal transferred by the mobile terminal MT2.

The base station BS2 transfers the power of signal $P_{2UE}$ transferred by the mobile terminal MT2 and received by the base station BS2 and the nominal transmission power $P_{2n}$ of signal transferred by the base station BS2 without any power reduction.

The base station BS1 determines the path gain $G_2$ between the mobile terminal MT2 and the base station BS2 from the signal transmission power $P_{UE}$ used by the mobile terminal MT2 and the power of signal $P_{2UE}$ transferred by the mobile terminal MT2 and received by the base station BS2. The base station BS1 determines also $P_2$ and $\alpha$.

According to a second variant of the first mode of realization, the base station BS1 does not know the power $P_{UE}$ of signals transferred by the mobile terminal MT2. In that case, the message transferred by the base station BS1 does not comprise the power $P_{UE}$ of signals transferred by the mobile terminal MT2.

The base station BS1 can use the path gain ratio $G_2/G_1$ instead of computing $G_2$.

Indeed, $$\begin{cases} P_{2UE} = G_2 \cdot P_{tUE} \\ P_{1UE} = G_1 \cdot P_{tUE} \end{cases} \Leftrightarrow \frac{G_2}{G_1} = \frac{P_{2UE}}{P_{1UE}}$$

where $P_{1UE}$ is the power of signals transferred by the mobile terminal MT2 and received by the base station BS1 and $P_{2UE}$ is the power of signals transferred by the mobile terminal MT2 and received by the base station BS2.

So parameter $\alpha$ can be computed as $$\alpha = \frac{P_1}{P_2} = \frac{G_1 \cdot P_{1n}}{G_2 \cdot P_{2n}} = \frac{P_{1UE} \cdot P_{1n}}{P_{2UE} \cdot P_{2n}}$$

According to a third variant of realization of the first mode of realization, the message transferred at step S403 and received at step S501 further comprises the signal power $P_1$ at the mobile terminal MT2 of signal transferred by the base station BS1.

The base station BS2 determines the path gain $G_2$ between the mobile terminal MT2 and the base station BS2 from the signal transmission power $P_{UE}$ used by the mobile terminal MT2 and the power of signal transferred by the mobile terminal MT2 and received by the base station BS2, determines $P_2$ and $\alpha$.

According to the third variant, the base station BS2 does not send at step S502 the value $P_2$ to the base station BS1, and steps S503, S405 and S406 are skipped.

According to a fourth variant of realization of the first mode of realization, the base station BS1 does not know the power $P_{UE}$ of signals transferred by the mobile terminal MT2. In that case, the message transferred by the base station BS1 does not comprise the power $P_{UE}$ of signals transferred by the mobile terminal MT2.

The base station BS1 transfers to the base station BS2 its transmit power $P_{1n}$ and the signal power $P_{1UE}$ it receives from the UE.

The base station BS2 measures the power $P_{2UE}$ of signals transferred by the mobile terminal MT2 and received by the base station BS2.

The base station BS2 computes parameter $\alpha$ as in the second variant of the first mode of realization.

FIG. 6 discloses an example of an algorithm executed by a base station which handles at least one mobile terminal according to a second mode of realization of the present invention when the base station is surrounded by a base station which is in energy saving mode.

The present algorithm is executed by each base station of the wireless cellular telecommunication network when it is in an operation mode which enables at least one mobile terminal to be handled by the base station.

The algorithm of FIG. 6 will be disclosed when it is executed by the base station BS1.

More precisely, the present algorithm is executed by the processor 300 of the base station BS1 in parallel for each mobile terminal handled by the base station BS1.

At step S600, the processor 300 obtains a minimum signal interference plus noise ratio $\rho$ that should be provided, for example, to the mobile terminal MT2 the base station BS1 handles.

The minimum signal interference plus noise ratio $\rho$ is obtained as disclosed at step S400 of FIG. 4.

At next step S601, the processor 300 monitors the power of signal received by the mobile terminal MT2 from the base station BS1 using, for example, measurement report transferred periodically by the mobile terminal MT2.

At next step S602, the processor 300 checks if the power of signal received by the mobile terminal MT2 from the base station BS1 is equal to or lower than the threshold Th determined for the mobile terminal MT2.

The threshold Th is determined as disclosed at step S402 of FIG. 4.

If the power of signal received by the mobile terminal MT2 from the base station BS1 is equal to or lower than the threshold Th determined for the mobile terminal MT2, the processor 300 moves to step S603 or to S604 according to a variant of the second mode of realization of the present invention. Otherwise, the processor 300 returns to step S601.

In the variant of the second mode of realization of the present invention, the base station BS2 transfers when it is in energy saving mode, signal at a transmission power $P_{2min}$ which does not enable at least the mobile terminal MT2 to be handled by the base station BS2. This transmission power depends on network topology and is determined for example by network planning and provided for example to the base station BS2 with configuration data.

At next step S603, the processor 300 sends a message to the base station BS2 requesting the base station BS2 which is in energy saving mode and not transferring any radio signal, to transfer signal at a transmission power $P_{2min}$ which does not enable the mobile terminal MT2 to be handled by the base station BS2.

At next step S604, the processor 300 monitors the power of signal $P_2$ received by the mobile terminal MT2 from the base station BS2 using, for example, measurement reports transferred periodically by the mobile terminal MT2.

At next step S605, the processor 300 computes an increase power factor $$\beta = \frac{P_1}{P_2}$$

to be applied by the base station BS2 on its minimal transmission power $P_{2min}$.

At next step S606, the processor 300 commands the transfer, to the base station BS2, of the increase power factor $\beta$.

At next step S607, the processor 300 marks the base station BS2 as being in the operation mode which enables a mobile terminal to be handled by the base station BS2.

FIG. 7 discloses an example of an algorithm executed by a base station which is in energy saving mode according to the second mode of realization of the present invention.

The present algorithm is executed by each base station of the wireless cellular telecommunication network when it is in the energy saving mode.

The algorithm of FIG. 7 will be disclosed when it is executed by the base station BS2.

At step S700, the base station BS2 is in the energy saving mode, i.e. the base station BS2 does not transfer any radio signals.

At next step S701, the processor 300 detects the reception of a message requesting the base station BS2, which is in energy saving mode and not transferring any radio signal, to transfer signal at a transmission power $P_{2min}$ which does not enable the mobile terminal MT2 to be handled by the base station BS2.

After that, the processor 300 moves to step S702.

In the variant of the second mode of realization of the present invention, the base station BS2 transfers, when it is in energy saving mode, signal at a transmission power $P_{2min}$ which does not enable at least the mobile terminal MT2 to be handled by the base station BS2. According to that variant, steps S701 and S702 don't need to be executed and the processor 300 moves from step S700 to S703.

At step S702, the processor 300 commands the wireless interface 305 to transfer a signal at a transmission power $P_{2min}$ which does not enable at the mobile terminal MT2 to be handled by the base station BS2.

At next step S703, the processor 300 detects the reception of the increase power factor $\beta$.

At next step S704, the processor commands the wireless interface 305 in order to switch in an operation mode which enables the mobile terminal MT2 to be handled by the base station BS2 by transferring signal at power $\beta \cdot P_{2min}$.

FIG. 8 discloses an example of an algorithm executed by a base station which handles at least one mobile terminal according to the first mode of realization of the present invention when the base station is surrounded by plural base stations which are in energy saving mode.

The present algorithm is executed by each base station of the wireless cellular telecommunication network when it is in an operation mode which enables a mobile terminal to be handled by the base station.

The algorithm of FIG. 8 will be disclosed when it is executed by the base station BS1.

More precisely, the present algorithm is executed by the processor 300 of the base station BS1 in parallel for each mobile terminal handled by the base station BS1.

At step S800, the processor 300 obtains a minimum signal interference plus noise ratio ρ that should be provided, for example, to the mobile terminal MT2 the base station BS1 handles.

The minimum signal interference plus noise ratio ρ is obtained as disclosed at step S400 of FIG. 4.

At next step S801, the processor 300 monitors the power of signal received by the mobile terminal MT2 from the base station BS1 using, for example, measurement report transferred periodically by the mobile terminal MT2.

At next step S802, the processor 300 checks if the power of signal received by the mobile terminal MT2 from the base station BS1 is equal to or lower than a threshold Th determined for the mobile terminal MT2 as disclosed at step S402 of FIG. 4.

If the power of signal received by the mobile terminal MT2 from the base station BS1 is equal to or lower than the threshold Th determined for the mobile terminal MT2, the processor 300 moves to step S803. Otherwise, the processor 300 returns to step S801.

At next step S803, the processor 300 sends a message to each neighbouring base station which is in energy saving mode requesting the neighbouring base station which is in energy saving mode to monitor the power of signal transferred by the mobile terminal MT2 and received by each neighbouring base station which is in energy saving mode.

The message comprises information identifying the mobile terminal MT2 as disclosed at step S403 of the algorithm of FIG. 4.

The message further comprises the power $P_{UE}$ of signals transferred by the mobile terminal.

At next step S804, the processor 300 receives from each neighbouring base station which is in energy saving mode, the value of the power signal $P_2$ the mobile terminal MT2 would receive from the base station which is energy saving mode if the base station which is energy saving mode was transmitting at its nominal power $P_{2n}$.

At next step S805, the processor 300 selects, among the neighbouring base stations which are in energy saving mode, the one which provides the highest received power $P_2$.

At next step S806, the processor 300 computes a power reduction factor $$\alpha = \frac{P_1}{P_2}$$

to be applied by the selected base station on its nominal transmission power $P_{2n}$.

At next step S807, the processor 300 commands the transfer, to the selected base station, of the power reduction factor α.

At next step S808, the processor 300 marks the selected base station as being in the operation mode which enables a mobile terminal to be handled by the selected base station.

FIG. 9 discloses an example of an algorithm executed by a base station which handles at least one mobile terminal according to the second mode of realization of the present invention when the base station is surrounded by plural base stations which are in energy saving mode.

The present algorithm is executed by each base station of the wireless cellular telecommunication network when it is in an operation mode which enables a mobile terminal to be handled by the base station.

The algorithm of FIG. 9 will be disclosed when it is executed by the base station BS1.

More precisely, the present algorithm is executed by the processor 300 of the base station BS1 in parallel for each mobile terminal MT handled by the base station BS1.

At step S900, the processor 300 obtains a minimum signal interference plus noise ratio ρ that should be provided, for example, to the mobile terminal MT2 the base station BS1 handles.

The minimum signal interference plus noise ratio ρ is obtained as disclosed at step S400 of FIG. 4.

At next step S901, the processor 300 monitors the power of signal received by the mobile terminal MT2 from the base station BS1 using, for example, measurement report transferred periodically by the mobile terminal MT2.

At next step S902, the processor 300 checks if the power of signal received by the mobile terminal MT2 from the base station BS1 is equal to or lower than a threshold Th determined for the mobile terminal MT2.

The threshold Th is determined as disclosed at step S402 of FIG. 4.

If the power of signal received by the mobile terminal MT2 from the base station BS1 is equal to or lower than the threshold Th determined for the mobile terminal MT2, the processor 300 moves to step S903 or to step S904 according to a variant of the second mode of realization of the present invention. Otherwise, the processor 300 returns to step S901.

In the variant of the second mode of realization of the present invention, the base stations BS transfer when they are in energy saving mode, signal at a transmission power $P_{2min}$ which does not enable at least the mobile terminal MT2 to be handled by the base stations.

At next step S903, the processor 300 sends to each neighbouring base station which is in energy saving mode and not transferring any radio signal a message requesting the base station to transfer signal at a transmission power $P_{2min}$ which does not enable at the mobile terminal MT2 to be handled by the base station.

At next step S904, the processor 300 monitors the powers $P_2$ of signals received by the mobile terminal MT2 from each neighbouring base station which is in energy saving mode using, for example, measurement report transferred periodically by the mobile terminal MT2.

At next step S905, the processor 300 selects among the neighbouring base stations which are in energy saving mode, the one which provides the highest received power $P_2$ at the mobile terminal MT2.

At next step S906, the processor 300 computes an increase power factor $$\beta = \frac{P_1}{P_2}$$

to be applied by the selected base station on its minimal transmission power $P_{2min}$.

At next step S907, the processor 300 commands the transfer to the selected base station, of the increase power factor β.

At next step S908, the processor 300 marks the selected base station as being in the operation mode which enables a mobile terminal to be handled by the base station BS2.

It has to be noted here that, according to a variant of the first and second modes of realization of the present invention, the quality of service to be provided to the mobile terminal is increased and/or a more robust modulation and coding scheme is allocated to the mobile terminal when the power of signal received by the mobile terminal from the base station BS1 is lower than or equal to the threshold Th. Such increase of the quality of service and/or of the modulation and coding scheme robustness is taken into account when computing the minimum SINR ρ determined at steps S400, S600, S800 and S900.

The threshold Th is increased accordingly, allowing to delay the time when a neighbouring base station in energy saving mode has to be switched into the operation mode which enables the mobile terminal MT2 to be handled by the base station BS2. This increase of quality of service and/or of the modulation and coding scheme robustness has impacts on base station load only the time for the mobile terminal to be handed over to the base station which leaves the energy saving mode.

It has to be noted here that at steps S406 and/or S606, S807 and/or S907, the processor 300 may command an increase of the robustness of the modulation and coding scheme and/or an increase of the amount of resources allocated to the mobile terminal MT2 in order to guaranty a communication link between the mobile terminal MT2 and the base station BS1 when the base station BS2 has to be switched into the operation mode which enables the mobile terminal MT2 to be handled by the base station BS2.

Naturally, many modifications can be made to the embodiments of the invention described above without departing from the scope of the present invention.

The invention claimed is:

1. A method for determining a transmission power, in a wireless cellular telecommunication network, in which condition a first base station, which is in an energy saving mode, has to switch to a normal operation mode, which would enable a mobile terminal to be handled by the first base station, the mobile terminal being currently handled by a second base station, wherein the method comprises:
operating the first base station in the energy saving mode that does not allow for handling any mobile terminals;
operating the second base station in the normal operation mode that allows for handling mobile terminals;
obtaining information representative of a path gain between the second base station and the mobile terminal;
obtaining information representative of a path gain between the first base station and the mobile terminal; and
determining, from the information representative of the path gain between the first base station and the mobile terminal and from the information representative of the path gain between the second base station and the mobile terminal, a power of transmission of a signal transferred by the first base station which would enable the mobile terminal to be handled by the first base station and by the second base station when the first base station is switched from the energy saving mode to the normal operation mode.

2. The method according to claim 1, wherein the step of obtaining information representative of a path gain between the first base station and the mobile terminal and the determining step are executed according to the value of the information representative of the path gain between the second base station and the mobile terminal.

3. The method according to claim 2, wherein the method further comprises:
transferring, by the second base station, a message requesting the first base station to monitor the power of the signal transferred by the mobile terminal and received by the first base station, the message further comprising the transmit power of signals transferred by the mobile terminal and in that the information representative of the path gain between the first base station and the mobile terminal is determined by the first base station.

4. The method according to claim 2, wherein the method further comprises:
transferring, by the second base station, a message requesting the first base station to transfer, in response, the power of the signal transferred by the mobile terminal and received by the first base station and in that the power of transmission of signal transferred by the first base station which enables the mobile terminal to be handled by the first base station and by the second base station is determined by the second base station.

5. The method according to claim 2, wherein the method further comprises:
transferring, by the second base station, a message requesting the first base station to monitor the power of the signal transferred by the mobile terminal and received by the first base station, and in that that the power of transmission of signal transferred by the first base station is determined by the first base station.

6. The method according to claim 2, wherein the method further comprises:
transferring, to the mobile terminal, a message requesting the mobile terminal to transfer information representative of the power of signal received by the mobile terminal and transferred by the first base station and in that the power of transmission of signal transferred by the first base station when the first base station transfers signal which enables the mobile terminal to be handled by the first base station and by the second base station is determined, by the second base station, from the power of the signal transferred by the first base station and received by the mobile terminal and the power of signal transferred by the second base station and received by the mobile terminal.

7. The method according to claim 5, wherein the method further comprises, executed prior to the transfer of the message to the mobile terminal:
transferring, by the second base station to the first base station a message requesting the first base station to transfer signal at a transmission power which does not enable a mobile terminal to be handled by the first base station.

8. The method according to claim 1, wherein the power of transmission is computed as an increase or decrease factor of the power of transmission of the first base station.

9. The method according to claim 2, wherein a threshold is determined from a signal interference plus noise ratio value determined for the mobile terminal.

10. The method according to claim 9, wherein the signal interference plus noise ratio value is determined according to a quality of service to be provided to the mobile terminal.

11. The method according to claim 10, wherein the method further comprises increasing the quality of service to be provided to the mobile terminal when the power of signal received by the mobile terminal from the second base station is lower than or equal to the threshold and/or allocating a more robust modulation and coding scheme to the mobile terminal.

12. The method according to claim 2, wherein plural base stations neighbouring the second base station are in the energy saving mode, a message is transferred to each base station neighbouring the second base station, the message requesting to monitor the power of the signal transferred by the mobile terminal and received by the first base station, and in that the method further comprises selecting among the base stations neighbouring the second base station, the first base station as the one receiving the signal transferred by the mobile terminal at the highest power.

13. The method according to claim 6, wherein plural base stations neighbouring the second base station are in the energy saving mode, the message requesting the mobile terminal to transfer information representative of the power of signal received by the mobile terminal and transferred by each base station neighbouring the second base station and in that the method further comprises selecting among the base stations neighbouring the second base station, the first base station as the one transferring the signal received by the mobile terminal at the highest power.

14. The method according to claim 1, wherein the second base station transfers information identifying the mobile terminal to the first base station, information identifying the mobile terminal being a cell radio network temporary identifier allocated by the second base station to the mobile terminal or dedicated pilot sequence and time/frequency pattern allocated by the second base station to the mobile terminal or a contention-based channel for initial transmission from mobile terminal to the second base station.

15. A device for determining in a wireless cellular telecommunication network, in which condition a first base station, which is in an energy saving mode has to switch to a normal operation mode, which would enable a mobile terminal to be handled by the first base station, the mobile terminal being currently handled by a second base station, wherein the device for determining in which condition the first base station which is in the energy saving mode has to switch, the first base station being operated in the energy saving mode that does not allow for handling any mobile terminals and the second base station being operated in the normal operation mode that allows for handling mobile terminals, the device comprising:

means for obtaining information representative of a path gain between the second base station and the mobile terminal;

means for obtaining information representative of a path gain between the first base station and the mobile terminal; and means for determining, from the information representative of the path gain between the first base station and the mobile terminal and from the information representative of the path gain between the second base station and the mobile terminal, a power of transmission of a signal transferred by the first base station which would enable the mobile terminal to be handled by the first base station and by the second base station when the first base station is switched from the energy saving mode to the normal operation mode.

16. A non-transitory computer-readable medium encoded with computer instructions, which cause a programmable device to execute, when said computer instructions are executed by the programmable device, a method for determining, in a wireless cellular telecommunication network, in which condition a first base station which is in an energy saving mode has to switch to a normal operation mode, which would enable a mobile terminal to be handled by the first base station, the mobile terminal being currently handled by a second base station, wherein the method comprises:

operating the first base station in the energy saving mode that does not allow for handling any mobile terminals;

operating the second base station in the normal operation mode that allows for handling mobile terminals;

obtaining information representative of a path gain between the second base station and the mobile terminal;

obtaining information representative of a path gain between the first base station and the mobile terminal; and determining, from the information representative of the path gain between the first base station and the mobile terminal and from the information representative of the path gain between the second base station and the mobile terminal, a power of transmission of a signal transferred by the first base station which would enable the mobile terminal to be handled by the first base station and by the second base station when the first base station is switched from the energy saving mode to the normal operation mode.

* * * * *